Patented Aug. 10, 1943

2,326,425

UNITED STATES PATENT OFFICE 2,326,425

PRODUCTION OF RIBOFLAVIN BY BUTYL ALCOHOL PRODUCING BACTERIA

Cornelius F. Arzberger, Terre Haute, Ind., assignor to Commercial Solvents Corporation, Terre Haute, Ind., a corporation of Maryland No Drawing. Application October 24, 1940, Serial No. 362,567

10 Claims. (Cl. 195—42)

My invention relates to the production of vitamins and more specifically to the production of riboflavin by the action of butyl alcohol-producing bacteria on a carbohydrate mash.

The synthesis of riboflavin by the action of butyl alcohol-producing bacteria on carbohydrate mashes has been disclosed in U. S. Pat. 2,202,161 by Carl S. Miner. In accordance with the process of this patent, carbohydrate mashes are fermented by means of Clostridium acetobutylicum (Weizmann), Clostridium saccharoacetobutylicum, Clostridium saccharo butyl acetonicum liquefaciens, or other butyl alcohol-producing bacteria, and riboflavin is recovered in the form of dried fermentation residues obtained by distilling the volatile fermentation products from the fermented mash, and evaporating and drying the distillation residue. The residues from the fermentation of molasses mashes, as reported in this patent, contain from 10 to 25 Bourquin-Sherman units of riboflavin per gram (approximately 25.0 to 62.5 micrograms of riboflavin per gram). Although such yields are sufficiently high to warrant commercial utilization of the process, they nevertheless represent very minute amounts of riboflavin. Such amounts, however, have been considered to be the maximum obtainable in a process of this type.

I have now discovered that these low yields are by no means the maximum obtainable, but have been caused by the inhibiting effect, on riboflavin synthesis, of certain metals, particularly iron, nickel, cobalt, copper, lead, and zinc. I have found that these metals may seriously reduce riboflavin synthesis when present in the fermentation mash, even in extremely small amounts. In the normal operation of a fermentation process employing butyl alcohol-producing bacteria, the fermentation mash may contain considerable amounts of these metals, without reducing carbohydrate fermentation to any great extent. However, I have found that the presence in the fermentation mash of even a few parts, per million, of compounds of certain of these metals may greatly reduce riboflavin synthesis, even though carbohydrate fermentation is substantially complete, and high yields of butyl alcohol and other neutral solvents are obtained. The riboflavin synthesis is so sensitive to the effect of these metals, that the metal content of the commercial raw materials normally employed in butyl alcohol fermentation mashes will usually be sufficient to reduce the riboflavin yields to a serious extent. For example, the iron content of molasses or of cereal grains handled by iron equipment will usually be sufficiently high to cause low yields of riboflavin in the fermentation of these materials. I have even found that iron oxides entrained in steam passing through iron pipes may be sufficient to decrease the yield of riboflavin from a fermentation mash sterilized by introducing such steam into the mash.

I have found that the inhibiting effect of these metals is particularly pronounced in the case of fermentations of cereal grain mashes by bacteria of the type Clostridium acetobutylicum (Weizmann). In such fermentations the inhibiting effect is so great that when it is reduced in accordance with my present invention, dried residues containing at least 150 micrograms of riboflavin, and usually at least 2000 micrograms, per gram of dry material may be obtained, instead of the 25 to 63 microgram products referred to above.

An object of my invention, therefore, is to reduce the inhibiting effect of these metals on riboflavin synthesis in the fermentation of carbohydrate mashes by means of butyl alcohol-producing bacteria. Another object of my invention is to obtain high yields of riboflavin in such a process, and especially in the fermentation of cereal grain mashes by means of butyl alcohol-producing bacteria of the type Clostridium acetobutylicum (Weizmann). A further object of my invention is to provide a suitable process for achieving these ends in commercial-scale operation.

In accordance with my invention, the effective amounts of iron, nickel, cobalt, copper, lead, and zinc present in the fermentation system are maintained sufficiently low to reduce the inhibiting effect of these metals on riboflavin synthesis i. e. below the degree of inhibition normally occurring in butyl alcohol fermentation as practiced heretofore. By the term "effective amount of metal," used herein, is meant the amount of metal which is present in the fermentation system in any state in which it is capable of exerting an inhibiting effect on riboflavin synthesis. Metal which is initially present in the metallic state, or as a compound which is substantially insoluble in a neutral initial mash, may be effective, for example, if it is capable of dissolving sufficiently rapidly in the acidic fermenting mash to reduce riboflavin synthesis. The fermentation system, i. e., the fermentation mash and the materials with which the mash is in contact, is preferably maintained free from substantial effective amounts of the inhibiting metals until at least the major portion of the fermentation and riboflavin synthesis is completed.

Those skilled in the art are of course aware that not only compounds of the metals discussed above, but other metal compounds and many other substances may reduce or completely inhibit carbohydrate fermentation if present in sufficiently large amounts in the mash. This, of course, is particularly true in the case of many well-known bactericides. A skilled bacteriologist or fermentation chemist will normally take precautions to prevent the reduction of carbohydrate fermentation by any of these substances. The present invention is concerned with the additional precaution of further reducing the effective amounts of these specific metals present in the fermentation system to the much lower amounts which are necessary for reducing inhibiting action on riboflavin synthesis.

The amounts of iron, nickel, cobalt, copper, lead, and zinc compounds in a butyl alcohol fermentation mash which will substantially reduce carbohydrate fermentation or solvent production are known in a general way, and can be determined for any particular mash and set of fermentation conditions, by increasing the amount of such compound in the mash, until a decrease in carbohydrate fermentation or solvent yield is obtained. The minimum amount of such metal compound which will substantially reduce riboflavin synthesis may be considered to be not more than one-tenth the amount which is known or determined to reduce substantially carbohydrate fermentation or solvent production, and is usually very much less than one-tenth of said amount. Relative amounts of metal compounds in the mash which substantially reduce carbohydrate fermentation or solvent production, and which substantially reduce riboflavin synthesis, are shown in the illustrative examples herein. The maximum concentrations which may be permitted in any given case will depend upon the degree of inhibition of riboflavin synthesis which is deemed permissible, and the economic feasibility of further reducing the metal concentrations. The optimum conditions, of course, constitute a mash which is initially substantially free from the inhibiting metals and which is maintained substantially free from such metals during subsequent processing.

In addition to the effect of the amounts of the inhibiting metals dissolved in the initial mash, subsequent contact of the mash with these metals or their compounds can very seriously reduce riboflavin synthesis. Thus, if the fermentation, or at least the first portion of the fermentation, is effected in an iron vessel, low yields of riboflavin will be obtained. The inhibiting action of metal surfaces is much less pronounced after the "acidity break" of the fermentation, and is apparently largely due to the metal being dissolved in the acidic fermentation mash. The fact that some stainless steels are much less inhibiting than iron, and dissolve to a less extent than iron in the fermenting mash, constitutes evidence in this respect, and I have obtained no conclusive evidence inconsistent with this theory. However, in view of the present state of knowledge of the oligodynamic effects of metals, it appears possible that exposed metal surfaces in contact with the mash may exert an inhibiting effect greater than would be accounted for by the dissolved metal. It is to be understood, therefore, that my invention is not to be considered as limited to any particular theory by which it may operate. As has previously been pointed out, the essence of my invention is in reducing the effective amounts of the specified metals present in the fermentation system in any and all states in which these metals are capable of exerting an inhibitory action on riboflavin synthesis.

The effect of iron introduced into the initial mash as metallic iron, and as iron compounds, may be seen from the following example:

EXAMPLE I

A corn mash of approximately 5.0% concentration, dry basis, was prepared by mashing in water, whole corn meal obtained from well-cleaned corn. To separate portions of this mash varying amounts of basic ferric acetate, $FeOH(C_2H_3O_2)_2$, and ferrous sulfate, $FeSO_4.7H_2O$, were added, as shown in the table below. To other portions iron strips were added, and in still other portions no iron was introduced. The separate mashes were sterilized and inoculated with an active culture of Clostridium acetobutylicum (Weizmann). During the mashing, sterilizing and fermenting operations, precautions were taken to prevent introducing into the fermentation system any inhibitory substances other than the measured amounts of the particular materials shown in the table. At the conclusion of the fermentation, the yield of solvents (butyl alcohol, acetone, and ethyl alcohol) was determined in each case, and the fermented mash was filtered and the filtrate evaporated to dryness. Yields of solvents, yields of riboflavin as determined by microbiological assay, residual carbohydrate content of the mashes, and riboflavin content of the dried filtrates are shown in the table.

*Table*

| Material added | Amount added, mg. per l. of mash | Solvent yield, per cent of original corn, dry basis | Residual carbohydrate,[1] per cent of original corn, dry basis | Riboflavin yield, μg. per gram of original corn | Riboflavin yield, μg. per gram of dried filtrate |
|---|---|---|---|---|---|
| None | | 26.4 | 5.1 | 508 | 2,720 |
| Basic ferric acetate | 3.2 | 27.4 | 5.0 | 238 | 1,245 |
|  | 32.0 | 27.6 | 5.3 | 39 | 192 |
|  | 320.5 | 26.9 | 5.1 | 25 | 122 |
|  | 3,205.0 | 27.2 | 3.4 | 30 | 144 |
|  | 32,050.0 | 15.0 | 14.4 | 33 | 86 |
| Ferrous sulfate | 3.2 | 26.6 | 5.0 | 163 | 810 |
|  | 32.0 | 27.8 | 5.5 | 39 | 197 |
|  | 320.5 | 28.0 | 4.9 | 15 | 69 |
|  | 3,205.0 | 24.3 | 4.1 | 31 | 145 |
|  | 32,050.0 | 3.2 | 68.4 | 38 | 33 |
| Black iron strip | [2] 5.1 | 28.0 | 5.9 | 86 | 460 |
|  | [3] 46.5 | 27.4 | 6.2 | 29 | 134 |

[1] Carbohydrate in filtrate, calculated as dextrose.
[2] Wt. lost during fermentation. Original wt.=1.286 g. per liter of mash. Surface=2.15 sq. cm. per liter of mash.
[3] Wt. lost during fermentation. Original wt.=10.120 g. per liter of mash. Surface=17.20 sq. cm. per liter of mash.

The following examples illustrate the effect of soluble salts of cobalt, nickel, copper, lead, and zinc, when added to the fermentation mash.

EXAMPLE II

To separate portions of corn mash, prepared as in Example I, were added varying amounts of cobaltous acetate, $Co(C_2H_3O_2)_2.4H_2O$, and nickel acetate, $Ni(C_2H_3O_2)_2.4H_2O$, as shown in the table below. Each portion of the mash was sterilized and inoculated with an active culture of *Clostridium acetobutylicum* (Weizmann). The precautions noted in Example I were taken to prevent the introduction of inhibitory materials other than the specific measured amounts shown in the table. At the conclusion of the fermentation the yield of solvents was determined, and the fermented mash was filtered and the filtrate evaporated to dryness. Solvent yields, riboflavin yields, and the riboflavin content of the dried filtrates are shown in the table below:

Table

| Material added | Amount added, mg. per l. of mash | Solvent yield, per cent of original corn, dry basis | Riboflavin yield, μg. per g. of original corn | Riboflavin yield, μg. per g. of dried filtrate |
|---|---|---|---|---|
| None | | 29.0 | 562 | 3,150 |
| Cobaltous acetate | 3.2 | 27.7 | 105 | 620 |
| | 32.0 | 27.9 | 75 | 242 |
| | 320.5 | 12.8 | 32 | 64 |
| Nickel acetate | 3.2 | 28.7 | 480 | 2,850 |
| | 32.0 | 28.9 | 398 | 2,240 |
| | 320.5 | 28.9 | 115 | 680 |
| | 3,205.0 | 6.6 | 25 | 38 |

EXAMPLE III

To separate portions of corn meal mash, prepared as in Example I, varying amounts of cupric acetate, $Cu(C_2H_3O_2)_2.H_2O$, and cuprous chloride, $Cu_2Cl_2$, were added, as shown in the table below. The separate mashes were sterilized and inoculated with an active culture of *Clostridium acetobutylicum* (Weizmann). The precautions noted in Example I were taken to prevent the introduction of inhibitory materials other than the specific measured amounts shown in the table. At the conclusion of the fermentation the yield of solvents was determined, and the fermented mash was filtered, and the filtrate evaporated to dryness. Solvent yields, riboflavin yields and the riboflavin content of the separate dried filtrates are shown in the table below:

Table

| Material added | Amount added, mg. per l. of mash | Solvent yield, per cent of orig. inal corn, dry basis | Riboflavin yield, μg. per g. of original corn | Riboflavin yield, μg. per g. of dried filtrate |
|---|---|---|---|---|
| None | | 28.8 | 532 | 2,890 |
| Cupric acetate | 3.2 | 31.0 | | 3,180 |
| | 32.0 | 31.0 | 387 | 2,030 |
| | 320.5 | 6.7 | 25 | 41 |
| Cuprous chloride | 3.2 | 29.6 | 398 | 1,990 |
| | 32.0 | 29.6 | 307 | 1,745 |
| | 320.5 | 6.9 | 29 | 66 |

EXAMPLE IV

To separate portions of corn mash, prepared as in Example I, varying amounts of zinc acetate $Zn(C_2H_3O_2)_2.2H_2O$, and lead acetate,

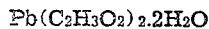

were added as shown in the table below. The separate mashes were sterilized and inoculated with an active culture of *Clostridium acetobutylicum* (Weizmann). The precautions noted in Example I were taken to prevent the introduction of inhibitory materials other than the specific measured amounts shown in the table. At the conclusion of the fermentation the yield of solvents was determined, the fermented mash was filtered, and the filtrate was evaporated to dryness. Solvent yields, riboflavin yields, and the riboflavin content of the dried filtrates are shown in the table below:

Table

| Material added | Amount added, mg. per l. of mash | Solvent yield, per cent of original corn, dry basis | Riboflavin yield, μg. per g. of original corn | Riboflavin yield, μg. per g. of dried filtrate |
|---|---|---|---|---|
| None | | 28.8 | 532 | 2,890 |
| Zinc acetate | 3.2 | 27.6 | 603 | 3,430 |
| | 32.0 | 29.4 | 539 | 2,945 |
| | 320.5 | 29.2 | 462 | 2,440 |
| | 3,205.0 | 4.0 | 34 | 55 |
| Lead acetate | 3.2 | 29.6 | 460 | 2,500 |
| | 32.0 | 29.8 | 407 | 2,295 |
| | 320.5 | 28.4 | 422 | 2,110 |
| | 3,205.0 | 5.3 | 26 | 39 |

It may be seen that the usual commercial-scale operation of a butyl alcohol-fermentation process must be modified in numerous respects to obtain optimum yields of riboflavin. The mashing, cooking, and fermenting vessels, mash coolers, pipe lines, etc., should be constructed of materials which will not give rise to inhibitory effects. This precaution is most important in the case of the fermentation vessel, in view of the fact that the acidic fermenting mash can dissolve substantial amounts of metals from metallic construction materials which are not corrosion-resistant. Aluminum and various aluminum alloys are suitable materials for the construction of apparatus for this process. I have found that aluminum is particularly desirable since this metal not only fails to cause inhibitory effects, but there is some evidence that a small amount of aluminum dissolved in the mash, in the form of a salt such as aluminum acetate, actually stimulates riboflavin formation.

In addition to precautions to prevent inhibitory effects caused by the mashing, cooking, cooling, and fermenting equipment, precautions must also be taken to prevent the introduction of inhibitory materials into the mash as impurities or constituents of any of the components of the mash. For example, inhibitory materials may be introduced by means of the water employed in the mashing, or even by the steam utilized for sterilization, if the latter is effected by direct steam contact with the mash. The entrainment of iron oxides in water or steam passing through iron pipe systems constitutes a common danger of contamination of the mash with inhibitory substances.

One of the worst sources of contamination of the mash with inhibitory materials constitutes the carbohydrate materials or other nutrient substances employed in the mash. Molasses, for example, is heavily contaminated with inhibiting metal compounds, and since these can only be removed with difficulty, my process is more effectively applied to the fermentation of other carbohydrate materials. Cereal grain meal constitutes one of the best sources of carbohydrate for this process but such materials are also commonly contaminated with inhibiting metals, especially iron. This contamination may arise from the dirt normally present in commercial supplies of cereal grains, or may be introduced in the grinding of such grains in steel equipment. In carrying out my process, I prefer first to subject the whole grain to a cleaning process, as, for example, by blowing the grain with air, and screening. The grain should also be passed over a magnetic separator to remove iron particles, and in case steel mills are employed for grinding, this magnetic separating operation may suitably be applied to the meal after grinding. The amount of iron which may be introduced in the grinding operation in steel mills differs with the type of mill, and with the condition of the mill. For example, very little iron is apparently introduced in grinding grain on a roller mill if the rolls are dull, but sufficient iron to cause inhibiting effects may easily be introduced by the use of a mill whose rolls have recently been sharpened.

In addition to the source of carbohydrate employed in the mash, other nutrients commonly used in butyl alcohol fermentation mashes may also serve as a source of contamination with inhibitory metal compounds. For example, if the carbohydrate source does not supply sufficient nitrogenous nutrients, an auxiliary source of such nutrients must be employed. Grain alcohol distillery slop is commonly used as a nutrient of this type. However, if this material is obtained in the usual commercial manner, involving processing in iron and copper equipment, it will ordinarily be sufficiently contaminated with inhibitory metal compounds to reduce the yields of riboflavin obtainable from mashes in which it is used.

It is thus seen that each ingredient of the fermentation mash may constitute a source of contamination with inhibitory materials. The possible reduction in riboflavin yields, which may be encountered by the introduction of inhibitory materials in the mash ingredients, is illustrated in the following examples:

EXAMPLE V

Mashes were prepared from commercial sources of Grade 1 and Grade 2 corn, with and without cleaning, by magnetic separation, screening and blowing with air prior to grinding. In each case the corn was ground in a stone mill, a mash of approximately 5% concentration was prepared and fermented by means of *Clostridium acetobutylicum* (Weizmann). The precautions noted in Example I were taken to prevent the introduction of any inhibitory materials other than the amounts present in the ingredients of the initial mash. At the conclusion of the fermentation, the solvent yield was determined and the fermented mash was evaporated to dryness. Solvent yields, riboflavin yields, and the riboflavin content of the dried residues are shown in the table below:

Table

| Corn grade | Air cleaning | Solvent yield, per cent of original corn, dry basis | Riboflavin yield, μg. per g. of original corn | Riboflavin yield, μg. per g. dry residue |
|---|---|---|---|---|
| 1 | No | 26.1 | 300 | 974 |
| 1 | Yes | 25.3 | 532 | 2037 |
| 2 | No | 26.6 | 284 | 865 |
| 2 | Yes | 25.1 | 530 | 1711 |

It is possible that a number of different inhibitory metal compounds are present in the dust, chaff, cob particles, and the like, removed in the cleaning operation. It appears, however, that the iron content of the material removed in cleaning is largely responsible for the inhibitory effects. For example, in cleaning a typical car of grade 1 corn, I found that the material removed by the air blowing operation contained 130 mg. of iron per 100 grams, whereas the cleaned corn contained less than 2 mg. of iron per 100 grams.

EXAMPLE VI

Corn mashes of approximately 5% concentration were prepared using well water for mashing in one case, and in another using steam condensate taken from an iron pipe in a steam supply system. These mashes were sterilized by steam pressure, without direct contact of the steam with the mash. The mashes were fermented by means of *Clostridium acetobutylicum* (Weizmann). The precautions noted in Example I were taken to prevent the introduction of any inhibitory materials other than the amounts present in the ingredients of the initial mash. At the conclusion of the fermentations the solvent yields were determined, the fermented mashes were filtered, and the filtrates were evaporated to dryness. Solvent yields, riboflavin yields, and the riboflavin content of the dried filtrates are shown in the table below.

Table

| Type of water in mash | Solvent yield, per cent of original corn, dry basis | Riboflavin yield, μg. per g. of original corn | Riboflavin yield, μg. per g. dried filtrate |
|---|---|---|---|
| Well water | 25.3 | 564 | 3,064 |
| Steam condensate | 25.1 | 60 | 348 |

The steam condensate used in the above example was found to contain 33 mg. of iron per liter.

It should be understood, of course, that the above examples are merely illustrative, and not to be taken as limiting in any way the scope of my invention. This is particularly true with respect to the numerical values for riboflavin yields reported. Such yields may vary over a wide range depending upon the effects of other conditions, as well as upon the effects of the inhibiting materials dealt with in the present invention. For example, numerous species and strains of butyl alcohol-producing bacteria normally produce low yields of riboflavin. My present invention will serve to prevent the further lowering of such yields, by preventing the adverse effects of the inhibitory materials discussed herein, but my invention cannot cause low-yielding cultures of bacteria to produce high yields of riboflavin. On the other hand, yields of riboflavin considerably higher than those of the above examples can be obtained. For example, when employing in the process of my present invention the impoved mashes described in co-pending application Ser. No. 362,568 of M. T. Walton, dried mash filtrates have been produced which contain as much as 6000 μg. of riboflavin per gram. The specific yields of the above examples are, therefore, to be considered primarily in a relative, rather than in an absolute sense, in showing the relationship between the yield obtainable under identical conditions in the presence or absence of these inhibiting materials.

It should also be understood that the procedures suggested herein for reducing the amounts of inhibitory materials in the fermentation system are subject to numerous modifications which will readily occur to those skilled in the art. Numerous different methods for removing the inhibitory substances from the mash ingredients can be employed, and various types of constructional materials which do not give rise to inhibitory effects may be used for the fermentation equipment, in addition to the particular materials mentioned above. Other types of carbohydrate mashes which are suitable for fermentation by butyl alcohol-producing bacteria can also be employed when following the procedure of my present invention. In general, it may be said that the use of any equivalents or modifications of procedure which would naturally occur to those skilled in the art, is included in the scope of my invention.

In the appended claims the terms "natural butyl fermentation residue" and "natural dried filtrate of a fermented mash from a butyl alcohol fermentation" refer to products substantially unchanged as to ratio and composition, except for the removal of water and solvents, from liquid butyl fermentation residues produced in the usual manner by the fermentation of suitable starch-containing mashes with butyl alcohol-producing bacteria.

My invention now having been described, what I claim is:

1. In a process for the production of high concentrates of riboflavin by fermentation of a carbohydrate mash by means of butyl alcohol-producing bacteria, the step which comprises maintaining the effective amounts of iron, nickel, cobalt, copper, lead, and zinc present in the fermentation system sufficiently low to reduce the inhibitory effects of said metals on riboflavin synthesis.

2. In a process for the production of high concentrates of riboflavin by fermentation of a carbohydrate mash by means of butyl alcohol-producing bacteria, the step which comprises maintaining the amounts of iron, nickel, cobalt, copper, lead, and zinc dissolved in the fermenting mash sufficiently low to reduce the inhibitory effects of said compounds on riboflavin synthesis.

3. In a process for the production of high concentrates of riboflavin by fermentation of a cereal grain mash by means of bacteria of the type Clostridium acetobutylicum (Weizmann), the step which comprises maintaining the effective amounts of iron, nickel, cobalt, copper, lead, and zinc present in the fermentation system sufficiently low to prevent substantial inhibitory effects of said metals on riboflavin synthesis.

4. In a process for the production of high concentrates of riboflavin by fermentation of a cereal grain mash by means of bacteria of the type Clostridium acetobutylicum (Weizmann), the step which comprises maintaining the amounts of iron, nickel, cobalt, copper, lead, and zinc dissolved in the fermenting mash sufficiently low to substantially prevent inhibitory effects of said compounds on riboflavin synthesis.

5. In a process in which a carbohydrate mash is fermented by means of butyl alcohol-producing bacteria with the production of riboflavin as one of the metabolic products, the steps which comprise preparing a mash in which the amounts of dissolved iron, nickel, cobalt, copper, lead, and zinc are sufficiently low to substantially prevent inhibitory effects of said compounds on riboflavin synthesis, and cooking, cooling, and fermenting said mash in equipment having inner surfaces substantially free from said metals in any forms in which said metals are substantially soluble in the fermenting mash.

6. In a process in which a cereal grain mash is fermented by means of bacteria of the type Clostridium acetobutylicum (Weizmann) with the production of riboflavin as one of the metabolic products, the steps which comprise preparing a mash in which the amounts of dissolved iron, nickel, cobalt, copper, lead, and zinc are sufficiently low to substantially prevent inhibitory effects of said compounds on riboflavin synthesis, and fermenting said mash in aluminum equipment.

7. In a process in which a cereal grain mash is fermented by means of bacteria of the type Clostridium acetobutylicum (Weizmann) with the production of riboflavin as one of the metabolic products, the steps which comprise cleaning said grain by magnetic separation and air blowing, grinding the cleaned grain, mashing the resulting meal with water, cooking and cooling the resulting mash, preventing the introduction of amounts of iron, nickel, cobalt, copper, lead, and zinc into the mash during said grinding, mashing, cooking, and cooling operations sufficient to inhibit substantial synthesis of riboflavin, and fermenting the resulting mash in aluminum equipment.

8. In a process for the production of high concentrates of riboflavin by fermentation of a cereal grain mash by means of bacteria of the type Clostridium acetobutylicum (Weizmann), the steps which comprise preparing a mash in which the amounts of dissolved iron, nickel, cobalt, copper, lead, and zinc are sufficiently low to substantially prevent inhibitory effects of said compounds on riboflavin synthesis, and fermenting said mash in equipment incapable of contributing additional substantial amounts of said metals to the said mash.

9. In a process for the production of high concentrates of riboflavin by fermentation of a carbohydrate mash by means of butyl alcohol-producing bacteria, the steps which comprise preparing a carbohydrate mash in which the amounts of dissolved iron, nickel, cobalt, copper, lead, and zinc are sufficiently low to substantially prevent inhibitory effects of said compounds on riboflavin synthesis, and fermenting said mash in contact only with surfaces incapable of adding substantial amounts of said metals to said mash.

10. In a process for the production of high concentrates of riboflavin by fermentation of a carbohydrate mash by means of butyl alcohol-producing bacteria, the steps which comprise preparing a mash in which the amounts of dissolved iron are sufficiently low to substantially prevent inhibitory effects of said compounds on riboflavin synthesis, and fermenting said mash in equipment incapable of contributing additional substantial amounts of said metal to the said mash.

CORNELIUS F. ARZBERGER.